United States Patent
Kondo

(10) Patent No.: US 7,315,939 B2
(45) Date of Patent: Jan. 1, 2008

(54) MICROCOMPUTER HAVING CLOCK CONTROL CIRCUIT AND INITIALIZING METHOD THEREOF

(75) Inventor: Takao Kondo, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 337 days.

(21) Appl. No.: 10/856,837

(22) Filed: Jun. 1, 2004

(65) Prior Publication Data
US 2004/0243878 A1 Dec. 2, 2004

(30) Foreign Application Priority Data
May 29, 2003 (JP) ............... 2003-152746

(51) Int. Cl.
*G06F 15/177* (2006.01)
(52) U.S. Cl. .............................. 713/1; 713/2
(58) Field of Classification Search ............ 713/1, 713/2
See application file for complete search history.

(56) References Cited

U.S. PATENT DOCUMENTS 5,196,810 A * 3/1993 Graether et al. ............. 331/49
5,406,567 A * 4/1995 Ogawa ....................... 714/724
2003/0009655 A1 * 1/2003 Blaner et al. ................. 713/1
2003/0046238 A1 * 3/2003 Nonaka et al. ............... 705/51

FOREIGN PATENT DOCUMENTS

JP        2001-92803        4/2001

* cited by examiner

*Primary Examiner*—Rehana Perveen
*Assistant Examiner*—Tse Chen
(74) *Attorney, Agent, or Firm*—Young & Thompson

(57) ABSTRACT

To provide a microcomputer which is improved to enable the functional selection of a functional macro and the characteristic correction without the mask option, trimming, and dedicated terminal and to quickly start the execution of the microcomputer. The microcomputer includes a main clock signal generating circuit and a ring oscillating circuit which generates a sub-clock signal that quickly enters a stable state. Initialized data is read from a flash ROM synchronously with the sub-clock signal, the read data is stored in a set data register, and a functional macro for the functional selection and characteristic correction is initialized. It is possible to end the setting of the functional macro for a clock stabilizing time necessary for the main clock signal. Further, it is possible to quickly execute the program by switching the signal to the main clock signal just after the clock stabilizing time.

3 Claims, 11 Drawing Sheets

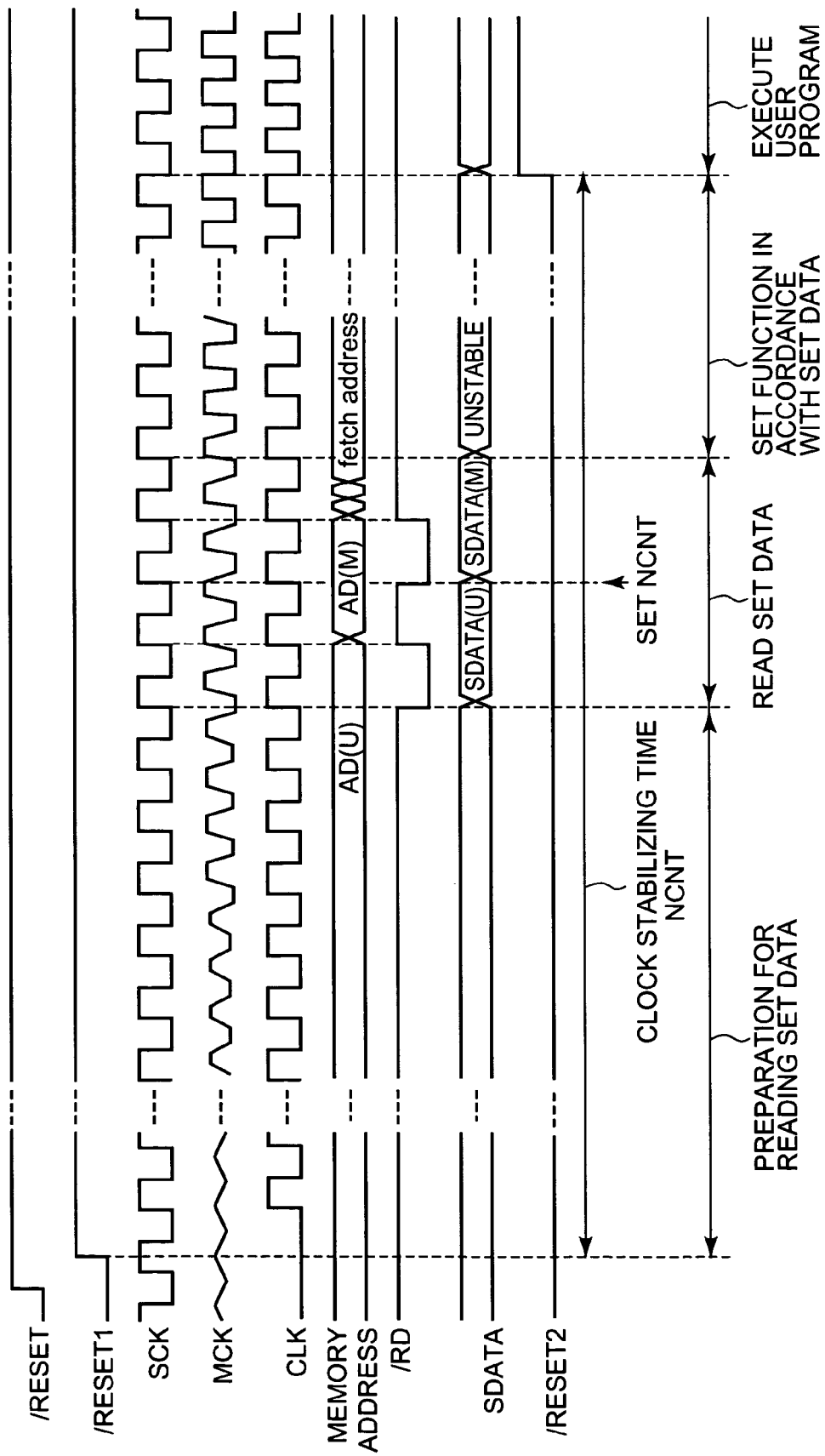

MICROCOMPUTER HAVING CLOCK CONTROL CIRCUIT AND INITIALIZING METHOD THEREOF

BACKGROUND OF THE INVENTION

1. Field of the Invention

The present invention relates to a microcomputer, and more particularly, to a microcomputer having a clock control circuit and an initializing method thereof.

2. Description of the Related Art

A single-chip microcomputer is formed by integrating, on a single chip, a CPU (Central Processing Unit), a memory, and various peripheral functional macros. For example, a request for initializing a peripheral function includes a request for determining whether or not the pull-up operation of an input/output port is valid and a request for determining whether or not a watchdog timer operates as a default upon starting the microcomputer. In the single-chip microcomputer, the request is varied depending on users. The fine adjustment after manufacturing includes the correction of offset voltage for the accuracy improvement of an A/D converter macro and the control for writing operation and a turned-off voltage for stress suppression due to a high electric-field of a flash ROM (Read-Only Memory). The fine adjustment is advantageous to improve the characteristics and the yield in the single-chip microcomputer.

In response to the above-mentioned requests, various methods are widely used, e.g., the trimming for adjusting the characteristics by using the fuse disconnection and the mask option for initializing the function by changing a mask pattern and the arrangement of a dedicated terminal for selecting the function and characteristic in accordance with an external voltage level of an input terminal. However, there are problems of the increase in number of kinds of products in the mask option, of the complication manufacturing processing in the trimming, and the increase in number of terminals in the dedicated terminal device.

Japanese Unexamined Patent Application Publication No. 2001-092803 (Patent Document 1) discloses a conventional art to solve the above-described problems in the microcomputer including the non-volatile memory. FIG. 12 is a block diagram showing the structure of the microcomputer according to the conventional art.

A microcomputer 400 according to the conventional art comprises: a flash ROM 41 which stores switch data for switching the wiring connection in a functional macro; a register 42 which inputs and holds the stored data; a functional macro 43 for receiving an output from the register 42; and a control circuit 44 which controls the flash ROM 41 and the register 42.

Upon starting the microcomputer 400, the control circuit 44 first issues a reading instruction to the flash ROM 41, simultaneously transmits an address signal and a write signal to the register 42, and transfers the data to the register 42 from the flash ROM 41. After transferring the data, the register 42 enters a continuous output-state. Thus, the switch data stored in the flash ROM 41 is supplied to the functional macro 43, and the wiring connection is switched so as to set the functional macro 43 to have a desired function. As mentioned above, according to the conventional art, the switch data prestored in the flash ROM 41 shifts to the register 42 upon starting the microcomputer, and the function of the functional macro 43 is selected by setting the switch in the functional macro. Therefore, various functions are realized only by overwriting the switch data stored in the flash ROM 41 without the mask option, the trimming, and the dedicated terminal.

Although not described in Japanese Unexamined Patent Application Publication No. 2001-092803 (Patent Document 1), a clock signal as a sync signal is necessary for sequentially transferring, to the register 42 from the flash ROM 41, a plurality pieces of switch data under the control of the control circuit 44. However, when the clock signal is generated in the chip using a crystal oscillating circuit and then is supplied to the microcomputer, or when an external clock signal externally supplied is phase-adjusted by a PLL (Phase Locked Loop) or DLL (Delay Locked Loop) and then is supplied to the microcomputer, the supply, in the microcomputer 400, of the stable clock signal after starting it needs a clock stabilizing time of several milliseconds (ms) or more. That is, according to the conventional art, after the microcomputer starts and the clock stabilizing time passes, and the preparation for reading the flash ROM starts. Further, after a predetermined reading preparing time, the transfer of the switch data starts from the flash ROM to the register. The determination of the microcomputer function needs to a waiting time which requires the completion of transfer from the flash ROM to the register and the setting of a switch in the functional macro in accordance with the switch data. Therefore, there is a problem that the microcomputer operating start is substantially delayed.

SUMMARY OF THE INVENTION

The present invention is devised in consideration of the problems and it is an object of the present invention to provide a microcomputer which is improved to enable the functional selection of the functional macro and the characteristic correction without the mask option, trimming, and dedicated terminal and the quick start operation of the microcomputer.

According to the present invention, a microcomputer comprises:

a CPU which executes a program in response to a system clock signal;

a main clock generating circuit which generates and outputs a main clock signal;

an oscillating circuit which is arranged independently of the main clock generating circuit and which generates and outputs s sub-clock signal;

a set data resister which holds initialized data; and a setting control unit having a function for selecting the sub-clock signal as the system clock signal in response to a control signal, a function for counting pulses of the system clock signals, a function for reading the initialized data that is non-volatilly stored and setting the read data to the set data register, and a function for selecting and outputting the main clock signal as the system clock signal when clock stabilizing time data matches a counted value of the pulse among the initialized data.

Further, according to the present invention, a microcomputer comprises:

a non-volatile memory which stores a program and initialized data including clock stabilizing time data and switch data of a setting-variable functional macro;

initialized data reading control means which starts the preparation for reading the initialized data in response to a first internal reset signal and controls the reading operation of the initialized data from the non-volatile memory synchronously with a system clock signal;

a CPU which executes the program in response to the system clock signal;

a main clock generating circuit which generates and outputs a main clock signal;

an oscillating circuit which is arranged independently of the main clock generating circuit and which generates a sub-clock signal;

a set data register which holds the initialized data read from the non-volatile memory;

a setting control unit which sets the first internal reset signal to an inactive level in response to a control signal, selects and outputs the sub-clock signal as the system clock signal, starts the counting operation of pulses of the system clock signal, sets a second internal reset signal to the inactive level when the clock stabilizing time data held in the set data register matches a counted value of the pulse, and selects and outputs the main clock signal as the system clock signal; and a setting-variable functional macro including a switching circuit which is initialized by the output from the set data register.

Furthermore, according to the present invention, an initializing method of a microcomputer comprises:

a step of selecting and outputting a main clock signal used for a system clock signal in a normal operating state and a sub-clock signal which quickly enters a stable state, in response to a control signal;

a step of counting a pulse of the sub-clock signal selected as the system clock signal;

a step of reading, from a non-volatile memory, initialized data including clock stabilizing time data and switch data of a setting functional macro, synchronously with the sub-clock signal selected as the system clock signal;

a step of storing the initialized data read from the non-volatile memory into a set data register; and a step of selecting, changing, and outputting the main clock signal as the system clock signal when it is detected that a counted value of the pulses of the system clock signals matches the clock stabilizing time data.

BRIEF DESCRIPTION OF THE DRAWINGS

FIG. 4 is a timing chart showing the start operation of the microcomputer according to the first embodiment;

DESCRIPTION OF THE PREFERRED EMBODIMENTS

Hereinbelow, a detailed description is given of embodiments of the present invention with reference to the drawings. In the following description, the embodiments of the present invention are shown as examples and the present invention is not limited to those.

Figure 1:
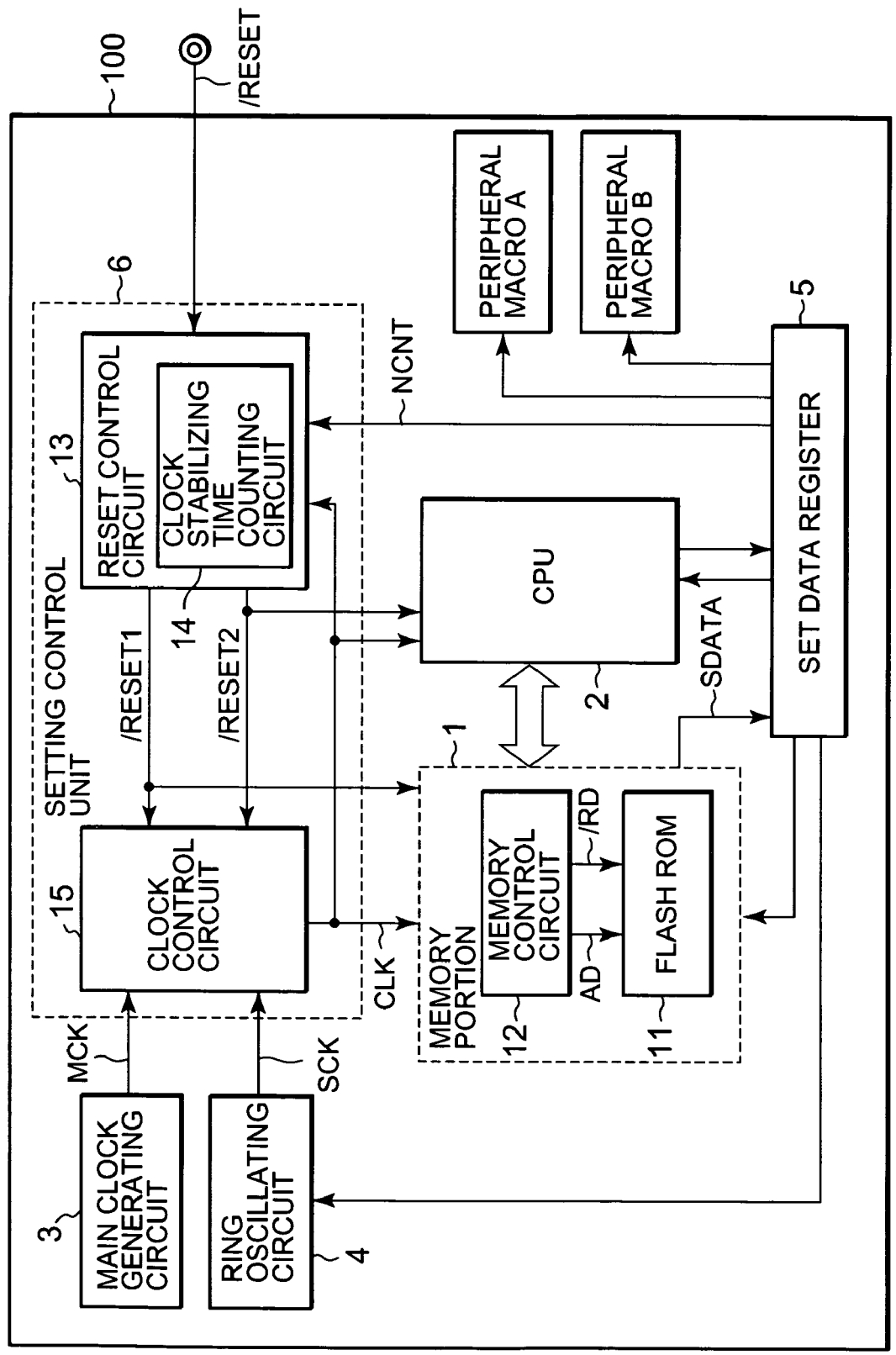
FIG. 1 is a block diagram showing the structure of a microcomputer according to the first embodiment of the present invention.

FIG. 1 is a block diagram showing the structure of a microcomputer according to the first embodiment of the present invention. Referring to FIG. 1, a microcomputer 100 comprises: a memory portion 1; a CPU 2; a main clock generating circuit 3; a ring oscillating circuit 4; a set data register 5; a setting control unit 6; and a setting-varying functional macro including a switching circuit that is initialized by an output from the set data register 5.

The memory portion 1 comprises: a flash ROM 11 which non-volatilly stores, into a part of a storage area thereof, initialized data including clock stabilizing time data and switch data for setting functional macros (a peripheral macros A and B shown in FIG. 1) which can set the functional selection or characteristic correction; and a dedicated memory control circuit 12 as initialized data reading control means which controls the reading operation of the initialized data from the flash ROM 11 synchronously with a system clock CLK. The memory control circuit 12 sets a reading voltage of the flash ROM 11 after a first internal reset signal /RESET1 is at the inactive level, and transmits a read signal /RD to the flash ROM 11 after a predetermined operation preparing period to set a first reading address. The flash ROM 11 outputs, as initialized data SDATA, the data stored in an address shown by an address signal AD when the read signal /RD is inputted. When the flash ROM is divided into a user area for storing a user program or data that is formed to allow the user to execute the desired operation by the microcomputer and a manufacturer area in which the user access is prohibited, the user area stores, as user set data SDATA (U), the switch data on the function selected by the user and the set clock stabilizing time. The manufacturer area stores manufacturer set data SDATA (M) which can be set only by the manufacturer. A signal with / (slash) at the head indicates that the low level is the active level.

After a second internal reset signal /RESET2 is at the inactive level, the CPU 2 fetches and executes the user program from the flash ROM 11 synchronously with the system clock signal CLK.

The main clock generating circuit 3 generates and outputs a main clock signal MCK which is used for the system clock signal CLK in the normal operating state such as the executing operation of the user program. The ring oscillating circuit 4 generates and outputs a sub-clock signal SCK when the power of the microcomputer 100 is turned on. Further, the ring oscillating circuit 4 comprises an odd number of inverters which are longitudinally connected on a ring.

Figure 2A:
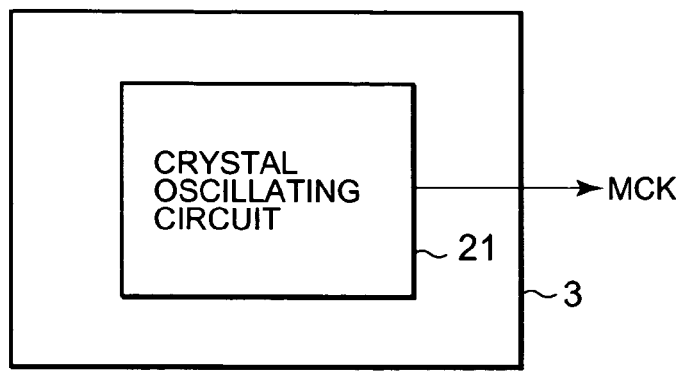
FIGS. 2A and 2B are diagrams showing examples of a main clock generating circuit.
Figure 2B:
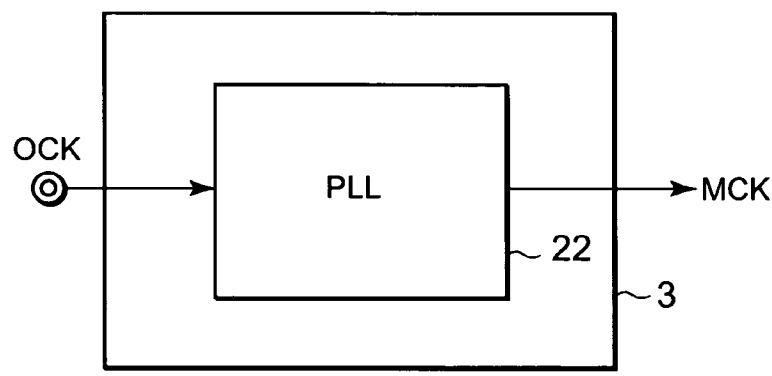

Referring to FIG. 2A, the main clock generating circuit 3 may be an oscillating circuit such as a crystal oscillating circuit, which generates the main clock signal MCK in a microcomputer chip. Alternatively, referring to FIG. 2B, the main clock generating circuit 3 may be a phase synchronizing circuit such as a PLL or DLL, which inputs an external clock signal, adjusts the phase, and generates the main clock signal MCK.

The set data register 5 reads the initialized data SDARA that is outputted from the flash ROM, and outputs clock stabilizing time data NCNT to the setting control unit 6. Further, the set data register 5 outputs the switch data to the functional macros (peripheral macros A and B) which can set the function selection or the characteristic correction.

The setting control unit 6 sets the first internal reset signal /RESET1 to the inactive level in response to the change to the inactive level of the external reset signal /RESET, and selects and outputs the sub-clock signal SCK as the system clock signal CLK. Simultaneously, the setting control unit 6 starts the counting operation of pulses of the system clock signal CLK. The setting control unit 6 counts pulses of the system clock signal CLK, and sets the second internal reset signal /RESET2 to the inactive level when the counted value is equal to the clock stabilizing time data NCNT that is inputted and held in advance from the set data register 5. Further, the setting control unit 6 selects and outputs the main clock signal MCK as the system clock signal CLK.

Specifically, the setting control unit 6 comprises a reset control circuit 13 and a clock control circuit 15. The reset control circuit 13 sets the first internal reset signal /RESET1 to the inactive level in response to the change to the inactive level of the external reset signal /RESET. The reset control circuit 13 comprises a clock stabilizing time counting circuit 14 for starting the counting operation of the pulses of the system clock signal CLK in response to the change to the inactive level of the external reset signal/RESET. Further, the reset control circuit 13 holds the clock stabilizing time data NCNT when the set data register 5 transmits it, and sets the second internal reset signal /RESET2 to the inactive level when the counted value (that is, the counted value of the clock stabilizing time) of the system clock signal CLK reaches the clock stabilizing time data NCNT. The clock control circuit 15 inputs the main clock signal MCK and the sub-clock signal SCK. Further, the clock control circuit 15 selects and outputs the sub-clock signal SCK as the system clock signal CLK when the first internal reset signal /RESET1 is at the inactive level and the second internal reset signal /RESET2 is at the active level. Furthermore, the clock control circuit 15 selects and outputs the main clock signal MCK as the system clock signal CLK when the second internal reset signal /RESET2 is at the inactive level.

Figure 3:
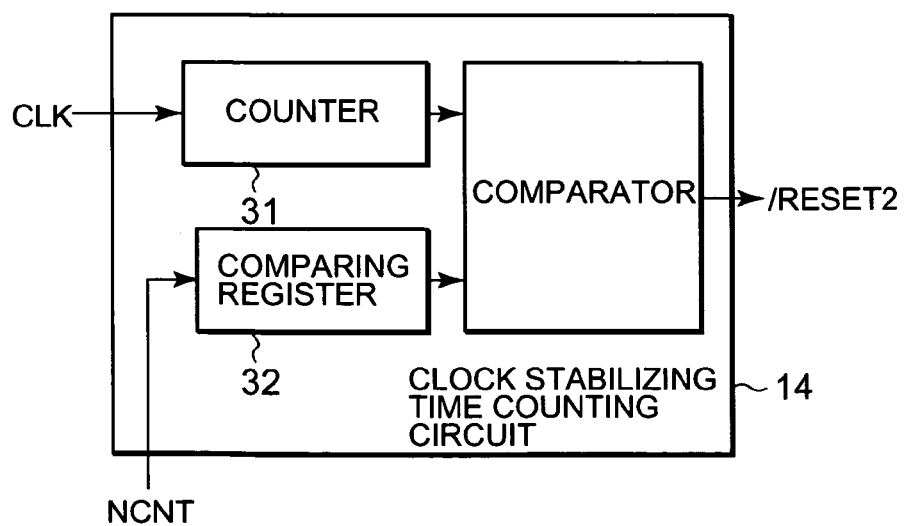
FIG. 3 is a block diagram showing one example of the structure of a clock stabilizing time counting circuit.

FIG. 3 is a block diagram showing the structure of the clock stabilizing time counting circuit 14 as an example. The clock stabilizing time counting circuit 14 comprises: a counter 31 which counts and outputs the pulses of the system clock CLK that is inputted; a comparing register 32 which sets the clock stabilizing time data NCNT; and a comparator 33 which compares a counted value output of the counter 31 with the clock stabilizing time data NCNT that is set to the comparing register 32 and sets the second internal reset signal /RESET2 to the inactive level when they match each other.

First, the comparing register 32 sets the maximum value set as a default value (e.g., when the external reset signal /RESET changes to the inactive level). The counter 31 automatically starts the counting operation when the sub-clock signal SCK is selected as the system clock signal CLK and the pulses are counted. During counting the pulses by the counter 31, the clock stabilizing time NCNT is inputted and is set to the comparing register 32. In this case, the counter 31 outputs the counted value at this timing and the counting operation continues without fail because the clock stabilizing time NCNT is much higher than the counted value. When the output from the counter 31 matches the clock stabilizing time data NCNT that is set to the comparing register 32, the comparator 33 detects such a fact and sets the second internal reset signal /RESET2 to the inactive level.

FIG. 4 is a timing chart showing the start operation of the microcomputer 100 according to the first embodiment. The start operation of the microcomputer 100 will be described with reference to FIG. 4.

The power of the microcomputer 100 is turned on and then the main clock generating circuit 3 and the ring oscillating circuit 4 start to operate. As mentioned above, when the main clock generating circuit 3 is the crystal oscillating circuit, a time of several msec from the gradual amplification of the fine vibration to the acquisition of the stable main clock signal MCK is required. On the contrary, the oscillation of the ring oscillating circuit 4 quickly enters a stable state and therefore the sub-clock signal. SCK quickly becomes a signal with stable period, phase, and amplitude.

When the power of the microcomputer 100 is turned on, a predetermined time passes from the on-power operation by a on-power reset circuit (not shown), then, the external reset signal /RESET is at the inactive level, and in response to thereto, the reset control circuit 13 sets the first internal reset signal /RESET1 to the inactive level. When the first internal reset signal /RESET1 is at the inactive level, the clock control circuit 15 selects the sub-clock signal SCK and outputs the selected signal as the system clock signal CLK. Simultaneously, the clock stabilizing time counting circuit 14 starts the counting operation of the pulses of the system clock CLK. The reading preparation of the initialized data stored in the flash ROM 11 starts synchronously with the sub-clock signal SCK selected as the system clock signal CLK.

After ending the setting of the user set data storing address AD (U) as a reading start address and ending the reading preparation of the flash ROM 11, the memory control circuit 12 sets the read signal /RD to the active level. Thus, the user set data SDATA (U) is read and is outputted from the user set data storing address AD (U) in the flash ROM 11. Then, the clock stabilizing data NCNT and the switch data set, by the user are stored in the set data register 5. Similarly, the manufacturer set data SDATA (M) is read and is outputted from the manufacturer set data storing address AD (M) and is additionally stored in the set data register 5.

Sequentially, the clock stabilizing time data NCNT is set to the clock stabilizing time counting circuit 14 from the user set data SDATA (U) stored in the set data register 5. The switch data is transmitted to the functional macro (e.g., peripheral macro A shown in FIG. 1) for selecting the setting by the user. A switching circuit in the functional macro settable by the user is set in accordance with the switch data. The switch data is transmitted to the functional macro (e.g., peripheral macro B shown in FIG. 1) for selecting the setting by the manufacturer. A switching circuit in the functional macro settable by the manufacturer is set in accordance with the switch data. As mentioned above, the clock stabilizing time data is set to the clock stabilizing time counting circuit 14 and the switching circuits in the functional macros whose setting is varied are set.

The clock stabilizing time counting circuit 14 counts the pulses of the sub-clock signal SCK selected as the system clock signal CLK, and the resultant data matches the clock stabilizing time data NCNT. Then, the clock stabilizing time counting circuit 14 sets the second internal reset signal /RESET2 to the inactive level.

The clock control circuit 15 changes the sub-clock signal SCK as the selected signal into the main clock signal MCK in response to the change to the inactive level of the second internal reset signal /RESET2, and outputs the main clock signal MCK as the system clock signal CLK. The CPU 2 sequentially reads and executes the user program stored in the user area of the flash ROM 11 synchronously with the main clock signal MCK selected as the system clock signal CLK after it is released from the resetting state by the inactivation of the second internal reset signal /RESET2.

Figure 5A:
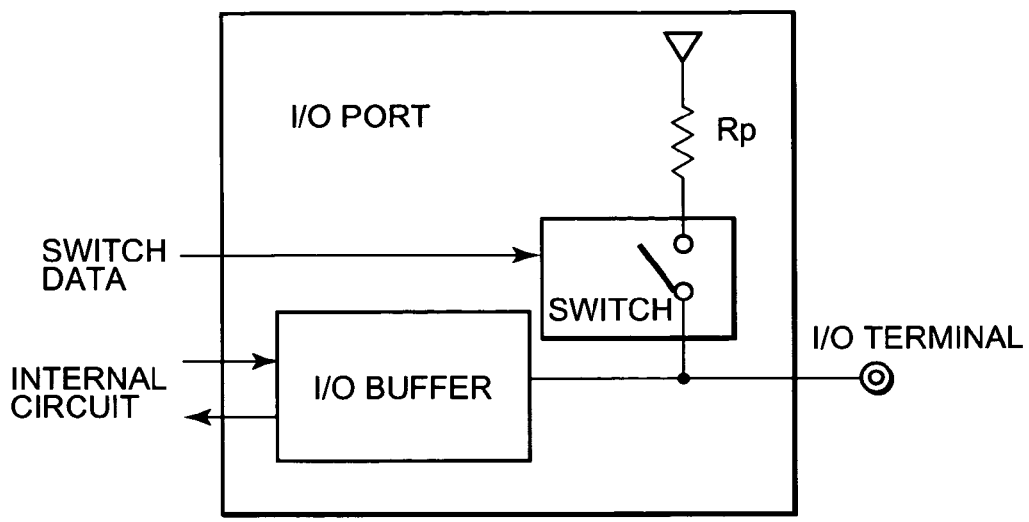
FIGS. 5A and 5B are diagrams showing examples of the functional selection and the characteristic correction of peripheral macros with switch data.
Figure 5B:
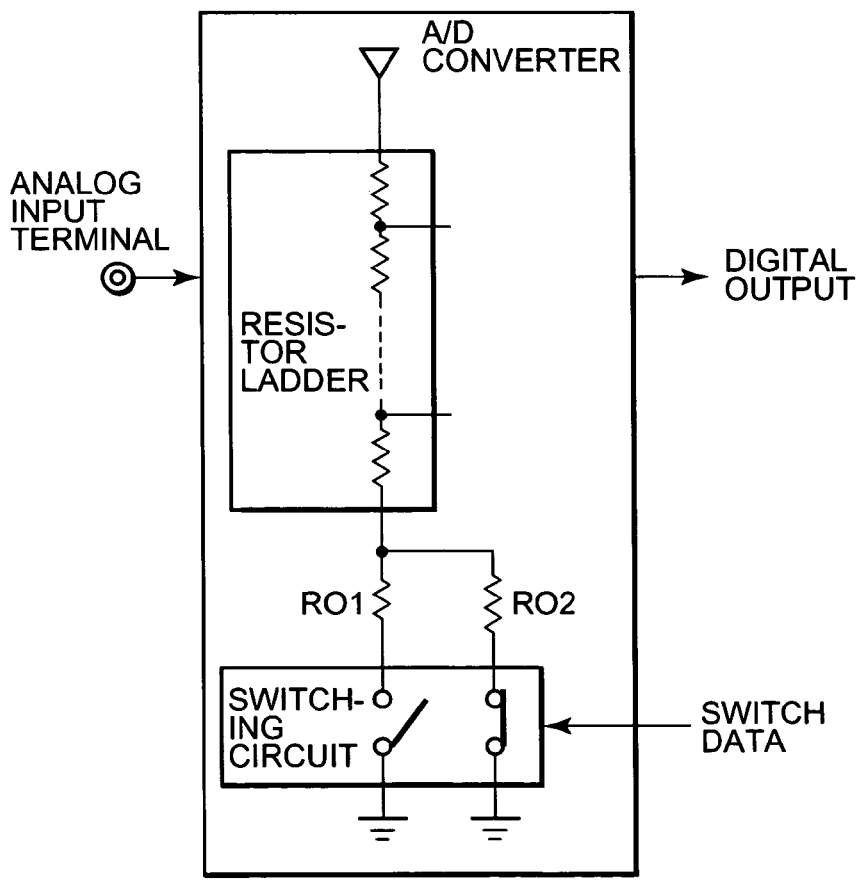

FIGS. 5A and 5B are diagrams showing examples of the functional selection and the characteristic correction of the peripheral macro by using the switch data stored in the set data register 5. FIG. 5A shows the example of the functional macro (e.g., peripheral macro A in FIG. 1) which can be setting-changed by the user and FIG. 5B shows the example of the functional macro (e.g., peripheral macro B in FIG. 1) which can be setting-changed by the manufacturer.

Referring to FIG. 5A, the peripheral macro A is an input/output port and it is selected by setting the switching circuit based on the switch data whether or not the user arranges a pull-up resistor Rp of the input/output port as one example. As another example for selection of the user, it may be selected by the switch data in response to an instruction from the CPU 2 whether the watch dog timer automatically operates upon starting or it starts to operate in response to an instruction from the CPU 2. Further, as another example, it may be selected by the switch data whether or not the external access to the user program storing area in the flash ROM 11 is prohibited.

Referring to FIG. 5B, the peripheral macro B is an A/D converter and it is corrected by setting the switching circuit based on the switch data whether the manufacturer selects any of offset resistances RO1 and RO2 for the offset amount of the A/D converter before shipping based on the switch data as one example. As another example for selection of the manufacturer, the characteristic of an analog circuit such as a low-voltage interface (I/F) or on-power clearing circuit may be adjusted by the switch data. In order to reduce the characteristic deterioration of a memory cell by applying a high voltage upon writing/erasing in the flash ROM 11, an output voltage for generating a voltage for writing/erasing in the flash ROM 11 may be adjusted based on the switch data. Further, in order to improve the accuracy for counting the clock stabilizing time, the oscillation frequency of the ring oscillating circuit may be adjusted based on the switch data.

In addition, the functional setting using the switch data can be applied to the switching setting to a test mode that is conventionally set by using the dedicated terminal, switching setting to a mode without a ROM that externally supplies the instruction without using an internal ROM for program development, and the setting of sequential magnification of the PLL.

As mentioned above, the microcomputer 100 according to the first embodiment comprises the main clock signal generating circuit 3 and the ring oscillating circuit 4 which generates the sub-clock signal SCK that quickly enters a stable state. Further, the microcomputer 100 reads the switch data from the flash ROM 11 synchronously with the sub-clock signal SCK, stores the read data into the set data register 5, and initializes the functional macro for varying the functional selection and characteristic correction. Therefore, the setting of the settable functional macro ends during the clock stabilizing time necessary for the main clock signal MCK. The program is promptly executed by switching the sub-clock signal SCK to the main clock signal MCK after the clock stabilizing time.

According to the first embodiment, the memory for non-volatilly recording the initialized data is the flash ROM as the example. However, the present invention is not limited to this. The non-volatile memory for electrical writing operation can be replaced with the flash ROM 11 according to the first embodiment. Further, the flash ROM 11 individually has the user area and the manufacturer area. However, the present invention can be applied to the case in which the non-volatile memory for electrical writing operation is commonly used for the user area and the manufacturer area. In this case, the user set data and the manufacturer set data are mixed and are stored in the memory and, however, there is basically no problem for realizing the first embodiment.

Figure 6:
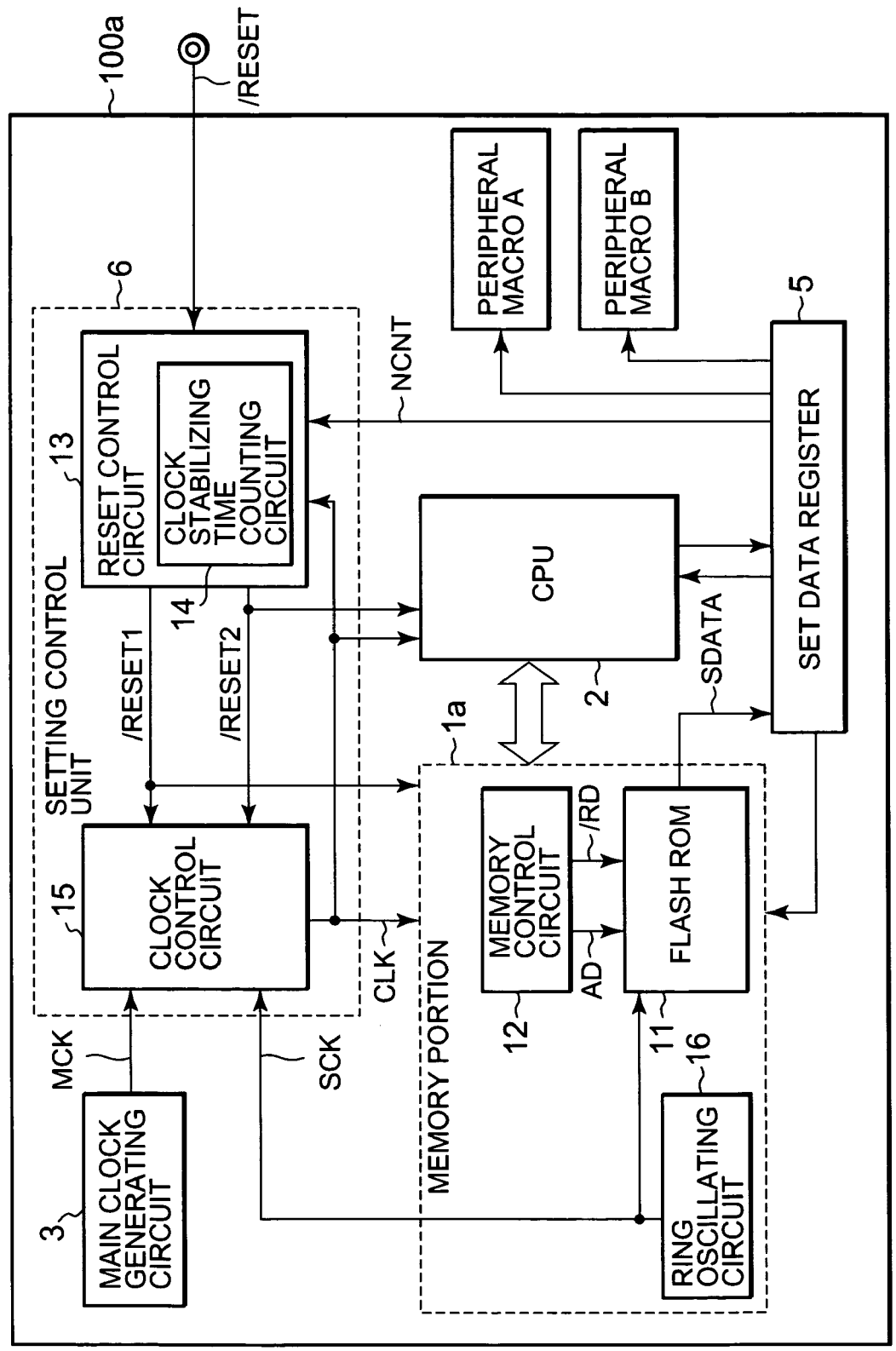
FIG. 6 is a block diagram showing the structure of a microcomputer according to the second embodiment of the present invention.

FIG. 6 is a block diagram showing the structure of a microcomputer 100a according to the second embodiment of the present invention. The microcomputer 100a comprises, in a memory portion 1a, a ring oscillating circuit 16 which supplies the clock signal to a voltage increasing circuit for generating a voltage for writing/erasing to the flash ROM 11. In the microcomputer 100a, the ring oscillating circuit 16 shares the function of the ring oscillating circuit 4 shown in FIG. 1 according to the first embodiment. Unlike the microcomputer 100 according to the first embodiment, in the microcomputer 100a, the sub-clock signal SCK is supplied from the ring oscillating circuit 16 and is inputted to the clock control circuit 15. However, in the microcomputer 100a, the CPU 2, the main clock generating circuit 3, the set data register 5, and the reset setting control unit 6 are the same as those according to the first embodiment. The operation of the microcomputer 100a is the same as that of the microcomputer 100 according to the first embodiment shown in the timing chart in FIG. 4. Therefore, similarly to the first embodiment, the microcomputer 100a according to the second embodiment ends the setting of the functional macro which can be setting-changed for the clock stabilizing time necessary for the main clock signal. The program can promptly be executed just after the clock stabilizing time.

According to the second embodiment, similarly to the first embodiment, the main clock generating circuit 3 may be an oscillating circuit such as a crystal oscillating circuit, or a circuit which adjusts the phase such as the PLL or DLL. Further, the flash ROM can be replaced with the non-volatile memory for electrical writing. According to the second embodiment, the non-volatile memory does not have the user area and the manufacturer area independently without fail.

Figure 7:
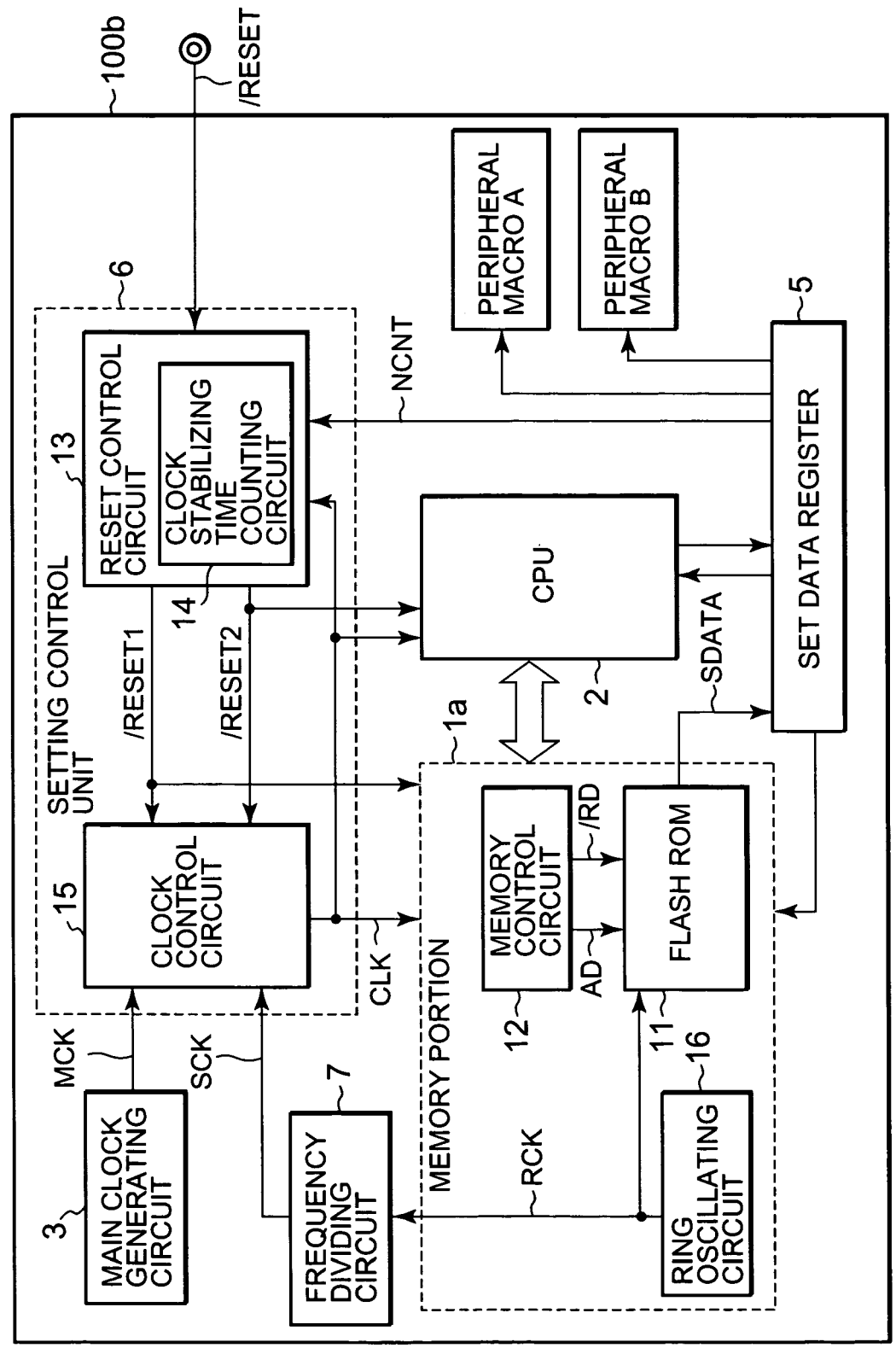
FIG. 7 is a block diagram showing the structure of a microcomputer according to the third embodiment of the present invention.

FIG. 7 is a block diagram showing the structure of a microcomputer 100b according to the third embodiment of the present invention. The microcomputer 100b comprises, in the memory portion 1a, the ring oscillating circuit 16 which supplies the clock signal to the voltage increasing circuit that generates the voltage for writing/erasing in the flash ROM 11, similarly to the microcomputer 100a shown in FIG. 6 according to the second embodiment. However, the microcomputer 100b according to the third embodiment further comprises a frequency dividing circuit 7 which inputs a clock signal RCK for increasing the voltage generated by the ring oscillating circuit 16 in the memory portion 1a, divides the frequency at a predetermined frequency-dividing ratio, and outputs the sub-clock signal SCK. According to the third embodiment, unlike the second embodiment, only the frequency dividing circuit 7 is additionally arranged. Other structures are the same as those according to the second embodiment. The operation of the microcomputer 100*b* is the same as that of the microcomputer 100 shown in the timing chart shown in FIG. 4. Therefore, similarly to the first and second embodiments, the microcomputer 100*a* according to the third embodiment ends the setting of the functional macro which can be setting-changed for the clock stabilizing time necessary for the main clock signal. The program can promptly be executed just after the clock stabilizing time. According to the third embodiment, when the frequency of the clock signal RCK for increasing the voltage is excessively higher than that of the main clock signal MCK, so that the operation of the memory portion 1*a* is not followed and, therefore, the clock signal RCK for increasing the voltage is not directly used as the sub-clock signal SCK, the clock signal RCK is used as the sub-clock signal SCK by the frequency division.

According to the third embodiment, similarly to the first and second embodiments, the main clock generating circuit 3 may be an oscillating circuit such as a crystal oscillating circuit, or a circuit which adjusts the phase such as the PLL or DLL. Further, the flash ROM can be replaced with the non-volatile memory for electrical writing. According to the second embodiment, the non-volatile memory does not have the user area and the manufacturer area independently without fail.

Figure 8:
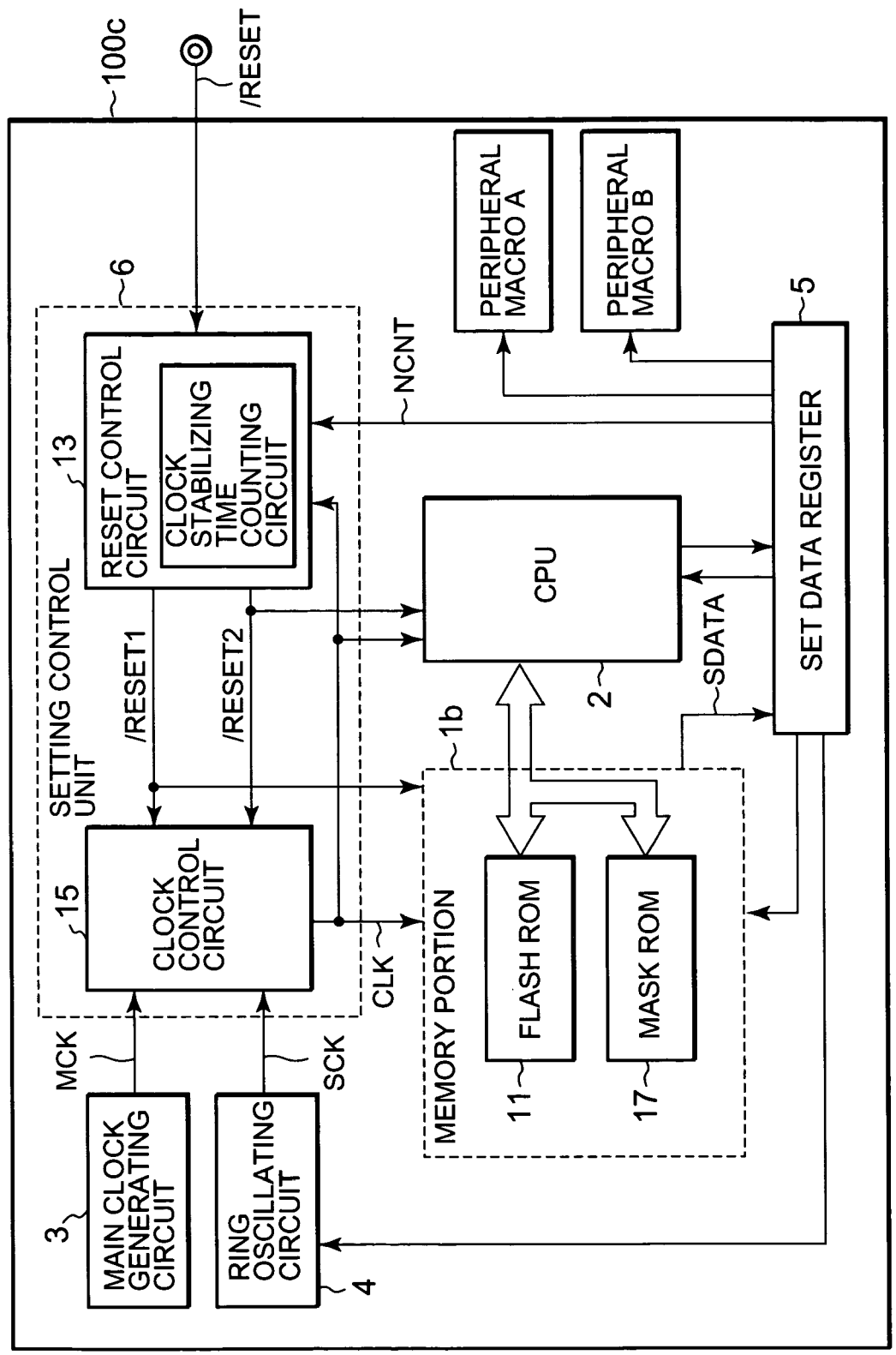
FIG. 8 is a block diagram showing the structure of a microcomputer according to the fourth embodiment of the present invention.

FIG. 8 is a block diagram showing the structure of a microcomputer 100*c* according to the fourth embodiment of the present invention. Since the frequency of the sub-clock signal SCK supplied from the ring oscillating circuit 4 is substantially equal to or more than that of the main signal MCK, it is possible to use the CPU 2 as initialized data reading control means and the mask ROM 17 which stores the program for reading the initialized data when the CPU 2 operates synchronously with the sub-clock signal SCK. That is, according to the fourth embodiment, the CPU 2 alternatively functions as the memory control circuit 12 according to the first embodiment in accordance with a program stored in the mask ROM 17.

Unlike the first embodiment, the microcomputer 100*c* according to the fourth embodiment has the mask ROM 17 in place of the memory control circuit 12 in a memory portion 1*b* and the CPU 2 receives the first internal reset signal /RESET1 in place of the second internal reset signal /RESET2. Other structures according to the fourth embodiment are the same as those according to the first embodiment. The mask ROM 17 is a ROM to which codes are written by a mask pattern upon chip manufacturing, and non-volatilly stores a program for allowing the CPU 2 to alternatively execute the operation of the memory control circuit 12. Upon starting, the CPU 2 fetches a command from the mask ROM 17 synchronously with the sub-clock signal SCK, reads the initialized data SDATA from the flash ROM 11, and stores the read data into the set data register 5.

Figure 9:
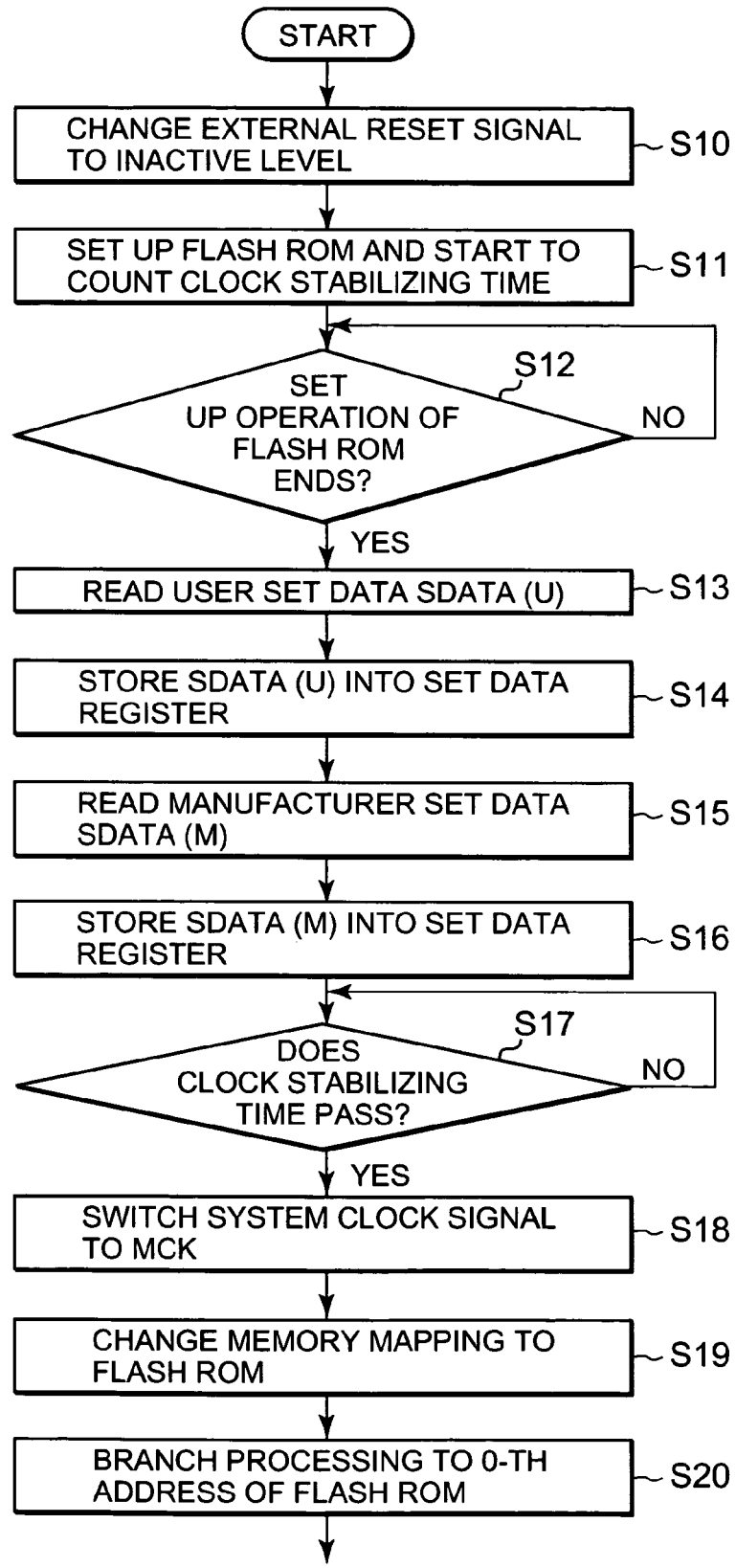
FIG. 9 is a flowchart showing the start operation of the microcomputer according to the fourth embodiment.

FIG. 9 is a flowchart showing the start operation of the microcomputer 100*c* according to the fourth embodiment. The operation according to the fourth embodiment will be described with reference to FIGS. 8 and 9.

After turning on the power of the microcomputer 100*c*, in step S10, an on-power reset circuit (not shown) changes the external reset signal /RESET to the inactive level. In response thereto, the reset control circuit 6 generates the first internal reset signal /RESET1, the resetting state of the CPU 2 is canceled, and the mapping is performed so that the access address of the CPU 2 becomes the 0-th (head address) of the mask ROM 17. The clock control circuit 15 selects and outputs the sub-clock signal SCK outputted by the ring oscillating circuit 4 as the system clock signal CLK.

Next, in step S11, the set-up operation of the flash ROM 11 starts under the control of the CPU 2, and the clock stabilizing time counting circuit 14 in the reset control circuit 13 starts to count the clock stabilizing time.

In step S12, the CPU 2 determines whether or not a predetermined preparing time passes for the set-up operation of the flash ROM 11 and, when the preparing time passes, the processing sequence advances to step S13.

In step S13, the CPU 2 controls the operation for reading the user set data SDATA (U) stored in the user set data storing address AD (U) in the flash ROM 11.

In step S14, the user set data SDATA (U) is stored in the set data register 5 and the clock stabilizing time data NCNT is set to the clock stabilizing time counting circuit 14.

In step S15, the CPU 2 controls the operation for reading the manufacturer set data SDATA (M) stored in the manufacturer set data storing address AD (M) in the flash ROM 11.

In step S16, the manufacturer set data SDATA (M) is additionally stored in the set data register 5. The switch data of the initialized data SDATA stored in the set data register 5 is transmitted to the functional macro setting-variable by the user and the functional macro setting-variable by the manufacturer. The switching circuit of setting-variable functional macro is set in accordance with the switch data.

In step S17, the clock stabilizing time counting circuit 14 continues to count the pulses of the system clock CLK until the counted value matches the clock stabilizing time data NCNT. When the counted value matches the clock stabilizing time data NCNT, the reset control circuit 13 sets the second internal reset signal /RESET2 to the inactive level and the processing sequence advances to step S18.

In step S18, the clock control circuit 15 switches, as the signal outputted as the system clock signal CLK, from the sub-clock signal SCK to the main clock signal MCK, in response to the change of the inactive level of the second internal reset signal /RESET2.

In step S19, the CPU 2 changes the memory mapping so that the next access address becomes the head address of the user program stored in the flash ROM 11.

In step S20, the CPU 2 branches the processing to the 0-th address (head address) in the flash ROM 11. Sequentially, the CPU 2 fetches the command from the flash ROM 11 and executes the user program. The following steps are omitted.

In the microcomputer 100*c* according to the fourth embodiment, instead of the memory control circuit 12 according to the first embodiment, the CPU 2 performs the operation for reading the initialized data from the flash ROM 11. Basically, the operation according to the fourth embodiment is the same as that shown in the timing chart in FIG. 4 according to the first embodiment. The setting of the setting-variable functional macro ends for the clock stabilizing time necessary for the main clock signal MCK. Therefore, the program is promptly executed just after the clock stabilizing time.

Many microcomputers have a mask ROM which previously stores, as a non-volatile memory, a communication algorithm of a communication port and the sequence for reading, writing, and erasing in the flash ROM 11. In such a case, the above-mentioned mask ROM may share the function of the above-mentioned mask ROM 17 by adding a program for controlling the reading of the initialized data to the stored data of the above-mentioned mask ROM.

According to the fourth embodiment, similarly to the first to third embodiments, the main clock generating circuit 3 may be an oscillating circuit such as a crystal oscillating circuit, or a circuit which adjusts the phase such as the PLL or DLL. Further, the flash ROM can be replaced with the non-volatile memory for electrical writing. According to the second embodiment, the non-volatile memory does not have the user area and the manufacturer area independently without fail.

Figure 10:
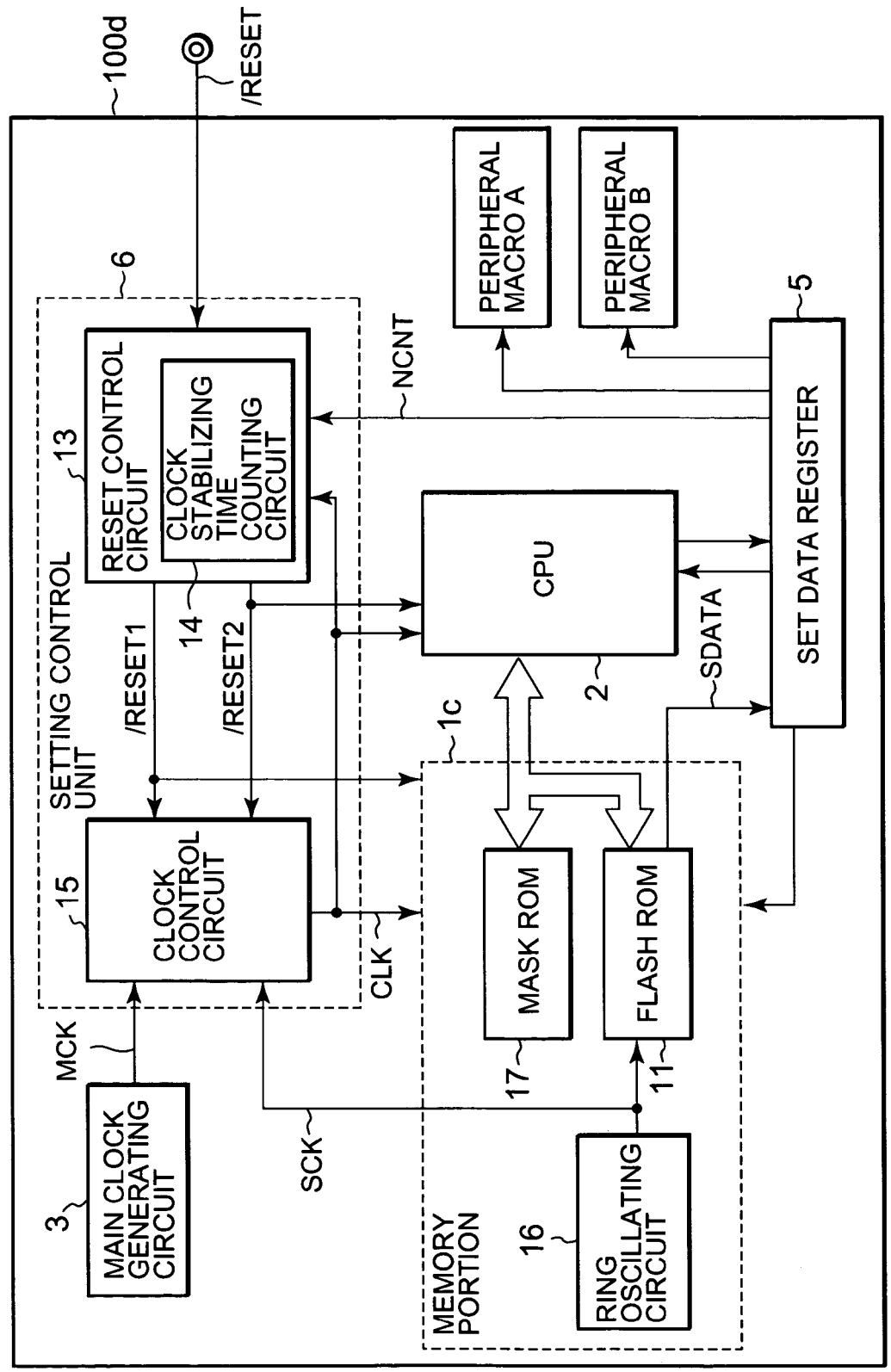
FIG. 10 is a block diagram showing the structure of a microcomputer according to the fifth embodiment of the present invention.

FIG. 10 is a block diagram showing the structure of a microcomputer 100d according to the fifth embodiment of the present invention. The microcomputer 100d comprises, in a memory portion 1c, the ring oscillating circuit 16 which supplies the clock signal to the voltage increasing circuit that generates the voltage for writing/erasing in the flash ROM 11. Further, the ring oscillating circuit 16 shares the function of the ring oscillating circuit 4 shown in FIG. 8 according to the fourth embodiment and other structures are the same as those according to the fourth embodiment. Similarly to the fourth embodiment, the microcomputer 100d according to the fifth embodiment ends the setting of the functional macro which can be setting-changed for the clock stabilizing time necessary for the main clock signal. The program can promptly be executed just after the clock stabilizing time.

According to the fifth embodiment, similarly to the first to fourth embodiments, the main clock generating circuit 3 may be an oscillating circuit such as a crystal oscillating circuit, or a circuit which adjusts the phase such as the PLL or DLL. Further, the flash ROM can be replaced with the non-volatile memory for electrical writing. According to the second embodiment, the non-volatile memory does not have the user area and the manufacturer area independently without fail.

Figure 11:
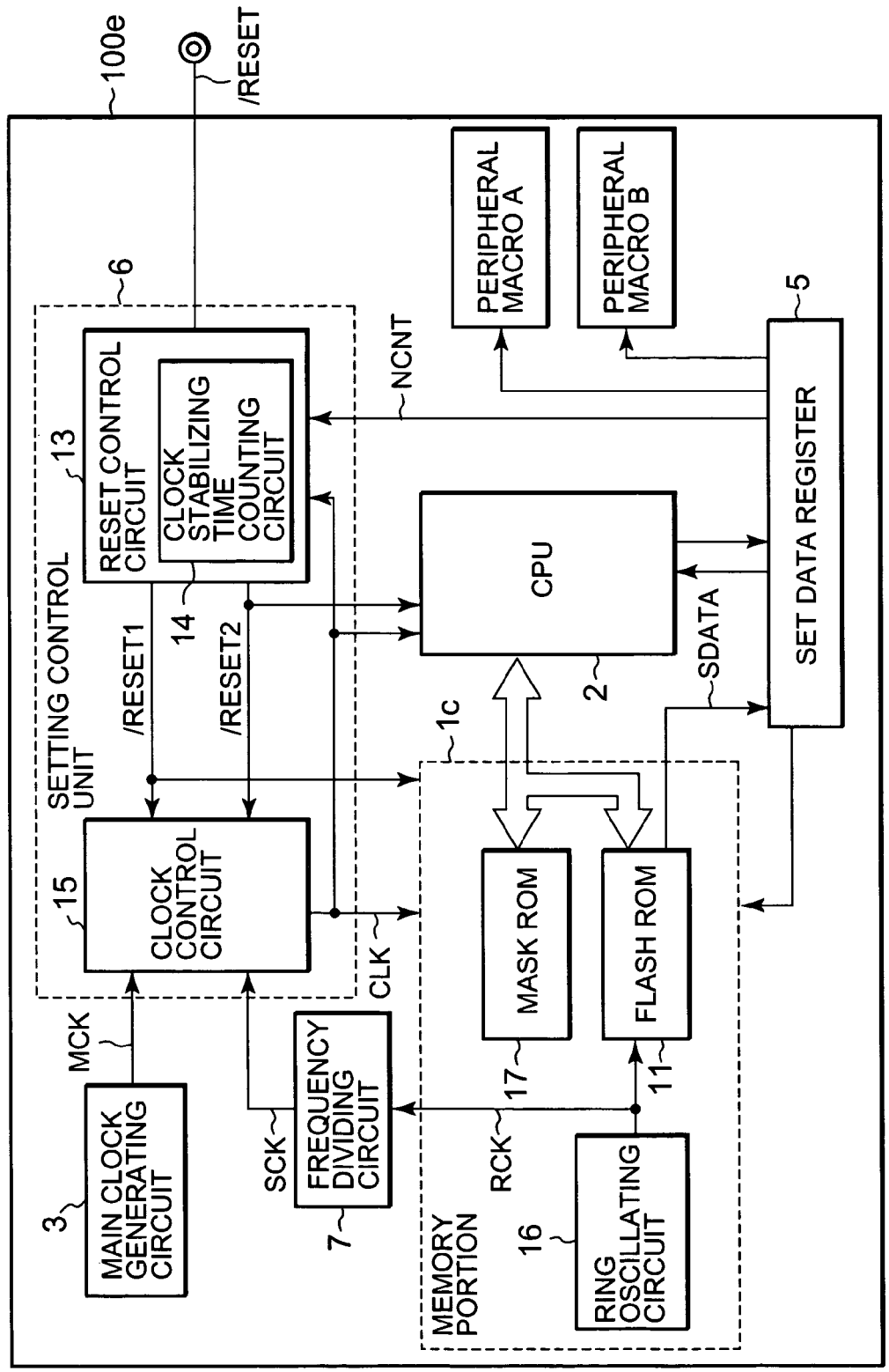
FIG. 11 is a block diagram showing the structure of a microcomputer according to the sixth embodiment of the present invention.
Figure 12:
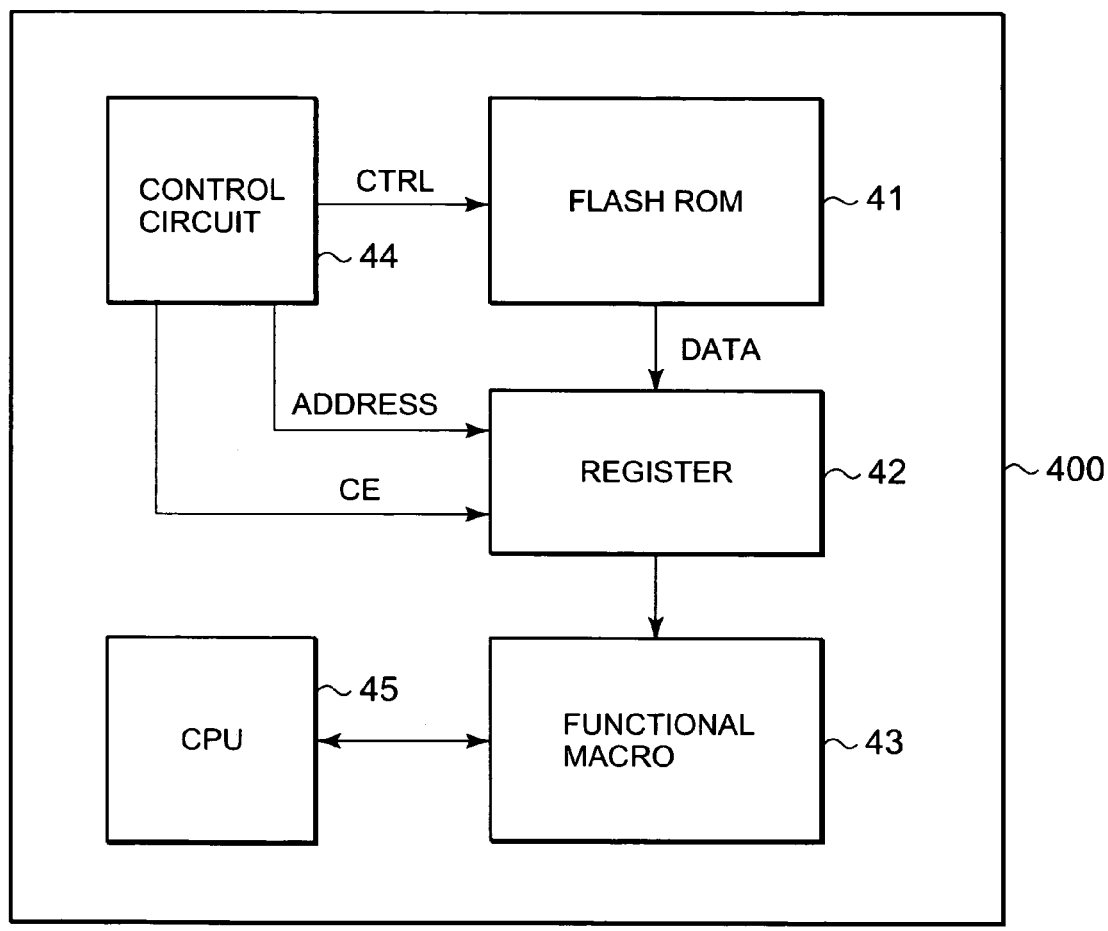
FIG. 12 is a block diagram showing the structure of a microcomputer according to one conventional art.

FIG. 11 is a block diagram showing the structure of a microcomputer 100e according to the sixth embodiment of the present invention. The microcomputer 100e according to the sixth embodiment comprises the frequency dividing circuit 7 which inputs the clock signal RCK for increasing the voltage generated by the ring oscillating circuit 16 in a memory portion 1c, divides the frequency at a predetermined frequency-dividing ratio, and outputs the divided frequency as the sub-clock signal SCK. Other structures are the same as those according to the fifth embodiment. Similarly to the first to fifth embodiments, the microcomputer 100e according to the sixth embodiment ends the setting of the functional macro which can be setting-changed for the clock stabilizing time necessary for the main clock signal. The program can promptly be executed just after the clock stabilizing time.

According to the sixth embodiment, similarly to the first and second embodiments, the main clock generating circuit 3 may be an oscillating circuit such as a crystal oscillating circuit, or a circuit which adjusts the phase such as the PLL or DLL. Further, the flash ROM can be replaced with the non-volatile memory for electrical writing. According to the second embodiment, the non-volatile memory does not have the user area and the manufacturer area independently without fail.

According to the first and second embodiments, the ring oscillating circuits 4 and 16 are used as the circuits for generating the sub-clock signal SCK. However, the circuit for generating the sub-clock signal SCK is not limited to the ring oscillating circuit and may be an oscillating circuit whose oscillation enters a stable state more quickly than the main clock generating circuit.

As mentioned above, the microcomputer of the present invention comprises the main clock signal generating circuit and the ring oscillating circuit which generates the sub-clock signal that quickly enters a stable state. The initialized data is read from the non-volatile memory synchronously with the sub-clock signal, the read data is stored in the set data register, and the functional macro for varying the setting of the functional selection and the characteristic correction is initialized. It is possible to end the initialization of the functional macro for varying the setting for the clock stabilizing time necessary for the main clock signal. Further, it is possible to promptly execute the program by switching the signal to the main clock signal just after the clock stabilizing time. Consequently, the function selection of the functional macro and the characteristic correction thereof are performed without the mask option, trimming, and dedicated terminal, and the execution of the user program quickly starts as the substantial start operation.

What is claimed is:

1. A microcomputer comprising:
   a non-volatile memory which stores a program and initialized data including clock stabilizing time data and switch data of a setting-variable functional macro;
   initialized data reading control means which starts the preparation for reading the initialized data in response to a first internal reset signal and controls the reading operation of the initialized data from said non-volatile memory synchronously with a system clock signal;
   a CPU which executes the program in response to the system clock signal;
   a main clock generating circuit which generates and outputs a main clock signal;
   an oscillating circuit which is arranged independently of said main clock generating circuit and which generates a sub-clock signal;
   a set data register which holds the initialized data read from said non-volatile memory;
   a setting control unit which sets the first internal reset signal to an inactive level in response to a control signal, selects and outputs the sub-clock signal as the system clock signal, starts the counting operation of pulses of the system clock signal, sets a second internal reset signal to the inactive level when the clock stabilizing time data held in the set data register matches a counted value of the pulse, and selects and outputs the main clock signal as the system clock signal; and
   a setting-variable functional macro including a switching circuit which is initialized by the output from said set data register,
   wherein said initialized data reading control means is a dedicated memory control circuit which is arranged independently of said CPU,
   said memory control circuit starts the reading control of the initialized data when the first internal reset signal is at the inactive level, and
   a resetting state of said CPU is canceled when the second internal reset signal is at the inactive level.

2. A microcomputer according to claim 1, wherein said oscillating circuit is shared by a ring oscillating circuit included in said non-volatile memory.

3. A microcomputer according to claim 1, further comprising:
   a frequency dividing circuit which divides an output from said oscillating circuit included in said non-volatile memory and outputs the divided output as the sub-clock signal, in place of said oscillating circuit.

* * * * *